United States Patent
Uehara

[19]

[11] Patent Number: 5,839,559
[45] Date of Patent: Nov. 24, 1998

[54] WEAR COMPENSATING FRICTION CLUTCH

[75] Inventor: Hiroshi Uehara, Osaka, Japan

[73] Assignee: Exedy Corporation, Japan

[21] Appl. No.: 831,887

[22] Filed: Apr. 3, 1997

[30] Foreign Application Priority Data

Apr. 4, 1996 [JP] Japan ................................. 8-108339

[51] Int. Cl.[6] .................................................. F16D 13/75
[52] U.S. Cl. ................................. 192/70.25; 192/111 A
[58] Field of Search .............................. 192/70.25, 111 A

[56] References Cited

U.S. PATENT DOCUMENTS

| | | | |
|---|---|---|---|
| 5,251,737 | 10/1993 | Flotwo ................................. | 192/70.25 |
| 5,431,268 | 7/1995 | Mizukami ............................ | 192/70.25 |
| 5,450,934 | 9/1995 | Maucher ............................. | 192/70.25 |
| 5,586,633 | 12/1996 | Mizukami et al. .................. | 192/70.25 |
| 5,588,517 | 12/1996 | Kooy et al. ......................... | 192/70.25 |
| 5,628,389 | 5/1997 | Wittmann et al. .................. | 192/70.25 |
| 5,632,365 | 5/1997 | Maucher ............................. | 192/70.25 |
| 5,641,048 | 6/1997 | Von Gaisberg ..................... | 192/70.25 |
| 5,727,666 | 3/1998 | Maucher ............................. | 192/70.25 |

OTHER PUBLICATIONS

D.A. Davies, BSc; Paper 1. Friction Clutches and Clutch Control Mechanisms; Proc Instn Mech Engrs 1969–70; pp. 1–38; vol. 184 Pt 31.

*Primary Examiner*—Charles A. Marmor
*Assistant Examiner*—Saúl Rodríquez
*Attorney, Agent, or Firm*—Marshall & Melhorn

[57] ABSTRACT

To allow a pivotal movement of a diaphragm spring when engaging and disengaging the clutch, a radially intermediate part of the diaphragm spring is supported by a J-shaped fulcrum support portions formed by lifting and curving a part of an inner peripheral part of an annular clutch cover. The fulcrum support portions are formed integrally with an annular disk formed along an inner periphery of an end plate of the clutch cover which is resiliently supported by a plurality of arcuate connecting pieces cut from the material of the clutch cover and extend circumferentially. As the wear of the facing progresses, the release load of the clutch increases due to the change in the operating point of the diaphragm spring. This increase in the release load causes the connecting pieces to deflect, and the fulcrum support portions to thereby move toward the clutch facing. The flexibility of the connecting pieces is selected so that the displacement of the fulcrum support portions corresponds to the amount of wear of the clutch facing. Thus, the configuration of the diaphragm spring can be kept fixed without regard to the wear of the clutch facing.

5 Claims, 4 Drawing Sheets

WEAR COMPENSATING FRICTION CLUTCH

TECHNICAL FIELD

The present invention relates to a friction clutch comprising a diaphragm spring for frictionally engaging a pressure plate with a clutch facing.

BACKGROUND OF THE INVENTION

In a friction clutch, for instance for automotive use, a pressure plate for frictionally engaging a clutch facing is resiliently supported by a clutch cover so as to be urged away from the clutch facing, and the pressure plate is resiliently urged toward the clutch facing by a diaphragm spring when the clutch is engaged. In such a friction clutch, the pressure plate is normally pressed against the clutch facing by the spring force of the diaphragm spring, and the clutch may be disengaged by displacing the diaphragm spring so as to remove the spring force applied to the pressure plate and thereby move the pressure plate away from the clutch facing.

The clutch is disengaged by engaging a central part of the diaphragm spring with a release bearing which is axially actuated by a clutch pedal, and axially moving the central part of the diaphragm spring with the operation of the clutch pedal. The diaphragm spring is pivoted as a result, and this releases the pressure applied to the pressure plate.

As the wear of the clutch facing progresses, the position of the pressure plate for engaging the clutch facing shifts toward the flywheel so that the point of force application by the diaphragm spring to the pressure plate also shifts toward the flywheel. As a result, the amount of deflection of the diaphragm spring when engaging the clutch changes with the progress in the wear of the clutch facing, and the orientation of the diaphragm spring changes from its initial state so that the point of force application by the release bearing to the diaphragm spring also changes.

For instance when the clutch pedal and the release bearing are connected to each other via a wire or a linkage mechanism, it is desired that the point of force application on the diaphragm remains fixed. However, the structure to achieve it tends to be highly complex.

Also, the diaphragm spring is provided with a negative spring constant property in the region where the clutch is released so that the pedal force required for disengaging the clutch may be minimized. For technical details of the diaphragm spring having a negative spring constant property, reference should be made to "Paper 1. Friction Clutches and Clutch Control Mechanisms" D. A. Davies, Proc Instn Mech Engrs, 1969–70, Vol 184 Pt 31. The contents of this publication is hereby incorporated in this application by reference. In terms of clutch release force, the change in the configuration of the diaphragm due to the wear of the clutch facing changes the operating point of the diaphragm spring, and this may result in an unacceptable increase in the pedal force required to disengage the clutch.

BRIEF SUMMARY OF THE INVENTION

In view of such problems of the prior art, a primary object of the present invention is to provide a friction clutch comprising a diaphragm spring for selectively engaging a clutch disk which can maintain the operating point of the diaphragm spring substantially fixed without regard to the progress of the wear of the clutch facing.

A second object of the present invention is to provide a friction clutch comprising a diaphragm spring which can maintain the position of the inner periphery of the diaphragm spring substantially fixed without regard to the progress of the wear of the clutch facing so that the pedal stroke may be prevented from changing during use.

A third object of the present invention is to provide a friction clutch comprising a diaphragm spring which is simple in structure and economical to manufacture.

According to the present invention, these and other objects can be accomplished by providing a friction clutch, comprising: a diaphragm spring consisting of an annular dish spring which resiliently urges a pressure plate into engagement with a clutch facing when the clutch is engaged, the pressure plate being connected to a clutch cover and resiliently urged away from the clutch facing; a fulcrum member for supporting a fulcrum point of the diaphragm spring; resilient support means for supporting the fulcrum member with respect to the clutch cover, the resilient support means having a flexibility which withstands a normal release load but yields to a release load substantially greater than the normal release load, the yielding movement of the resilient support means producing a corresponding gap therein; and wedge means which is biased by resilient adjusting means and adapted to fill the gap; whereby an increase in the release load resulting from a wear in the clutch facing creates the gap, and the wedge means fills the gap so as to shift the diaphragm spring to a new position corresponding to a progress in the wear without substantially changing an operating point of the diaphragm spring.

Thus, owing to the adjusting movement of the fulcrum member which in turn owes to the appropriate flexibility of the resilient support means combined with the action of the wedge means preventing the reversing movement of the resilient support means, the diaphragm spring is allowed to shift toward the clutch facing as the wear of the clutch facing progresses. In particular, when the resilient support member is provided with a flexibility which produces a displacement substantially equal to $d1 \cdot L2/(L1+L2)$, where $d1$ is the amount of wear of the clutch facing, $L1$ is a radial distance between the fulcrum point of the diaphragm spring and a point of engagement between the pressure plate and the diaphragm spring, and $L2$ is a radial distance between the fulcrum point of the diaphragm spring and a point of the diaphragm spring engaging a release bearing, the diaphragm spring substantially translates toward the clutch facing by a distance corresponding to the amount of wear of the clutch facing.

By thus shifting the diaphragm spring without changing the configuration of the diaphragm spring, it is possible to maintain the operating point of the diaphragm spring at the time of clutch release substantially fixed, and to thereby keep the pedal force required for releasing the clutch substantially fixed. Also, the point of engagement between the inner periphery of the diaphragm spring and the release bearing can be kept fixed without regard to the progress of the wear of the clutch facing, and any change in the pedal stroke required for releasing the clutch can be avoided.

According to a preferred embodiment of the present invention, the fulcrum member comprises a pair of annular wire members interposing the fulcrum point of the diaphragm spring, and the resilient support means comprises a resilient support member integrally extending from the clutch cover and having the annular wire members secured thereto. Preferably, the resilient support member comprises an annular disk and connecting pieces connecting the annular disk to a remaining part of the clutch cover, both the annular disk and the connecting pieces being cut from material of the clutch cover.

Also, the resilient support member may further comprise a J-shaped extension passed through a hole formed in the diaphragm spring and holding the annular wire members on a concave side thereof, and the wedge means may comprise a slider member having a main body circumferentially slidably engaged to the annular disk, a wedge member extending radially from the annular slider main body and adapted to move into the gap, and a spring member circumferentially biasing the annular slider main body relative to the clutch cover so as to move the wedge member into the gap.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
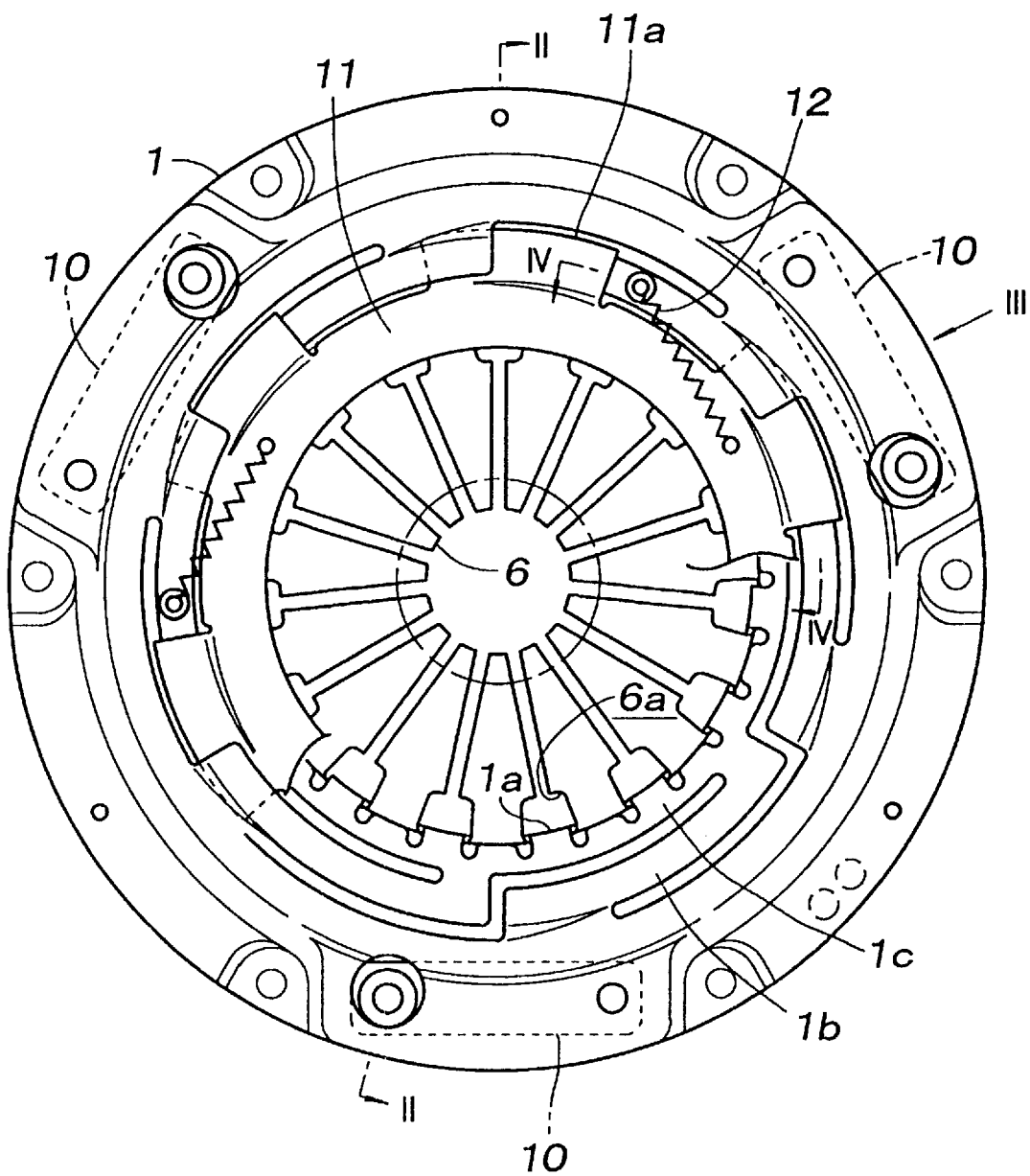
FIG. 1 is an overall front view of a clutch cover of a friction clutch to which the present invention is applied.
Figure 2:
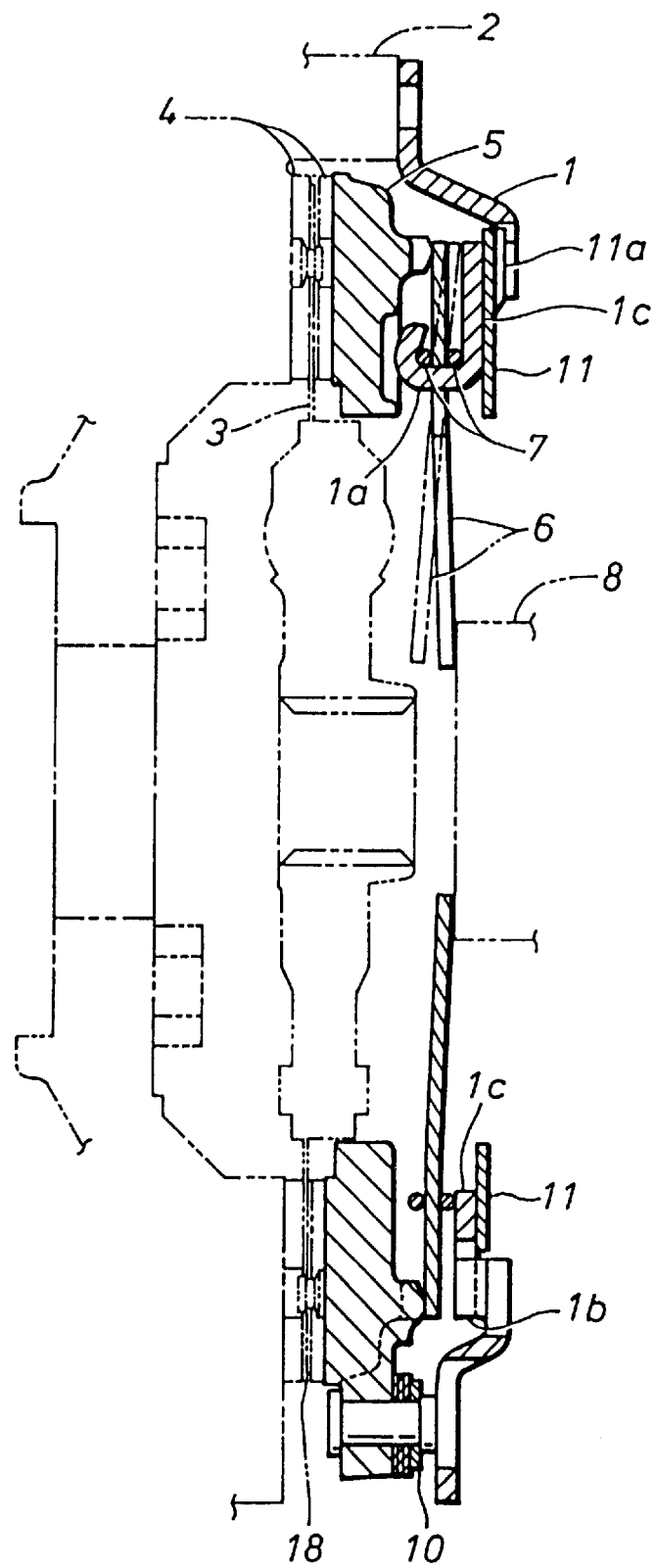
FIG. 2 is a sectional view of an essential part of the friction clutch taken along line II—II of FIG. 1.

FIG. 1 is an overall front view of a clutch cover 1 of a friction clutch to which the present invention is applied, and FIG. 2 is a sectional side view of an essential part taken along line II—II of FIG. 1. As shown in the drawings, the clutch cover 1 is securely attached to an input end of the flywheel 2, and a space defined between them accommodates a clutch disk 3 including a pair of planar and annular clutch facing members 4 attached to either side thereof, an annular pressure plate 5 for pressing the clutch disk 3 against the flywheel 2, and a diaphragm spring 6 for resiliently biasing the pressure plate 5.

The diaphragm spring 6 includes a plurality of comb-shaped tongue pieces formed by cutting out a plurality of radial slots from an inner periphery of the dish spring at an equal angular interval. The forward or inner end of each of the radial slots of the diaphragm spring 6 defines an opening 6a which is more laterally extended than the remaining part of the radial slot, and, as best illustrated in FIG. 2, a J-shaped fulcrum support portion 1a formed by lifting and curving the material of a part of an inner peripheral part of the annular clutch cover 1 is passed through each of the openings 6a across the thickness of the diaphragm spring 6.

A pair of fulcrum ring members 7 are circumferentially passed through the concave side of each of the fulcrum support portions 1a in an axially spaced and coaxial relationship, holding a radially intermediate part of the diaphragm spring 6 therebetween across the thickness thereof so as to provide a fulcrum point for the diaphragm 6 when engaging and disengaging the clutch. The diaphragm spring 6 can undergo a pivoting movement in either direction using the corresponding one of the fulcrum ring members 7.

The free ends of the comb shaped tongues defined along the inner periphery of the diaphragm spring 6 are adapted to engage a release bearing 8. The pressure plate 5, in its installed state, is resiliently biased by the outer periphery of the diaphragm spring 6 so as to achieve the engaged state of the clutch as illustrated in FIG. 2.

Figure 3:
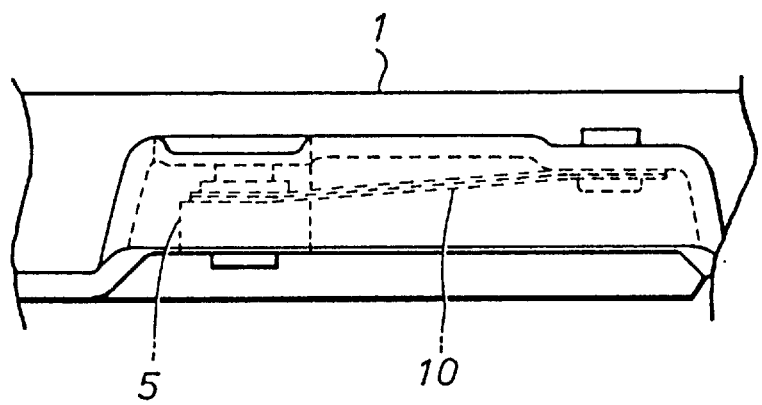
FIG. 3 is a sectional view of an essential part of the friction clutch as seen from arrow III of FIG. 1.
Figure 5:
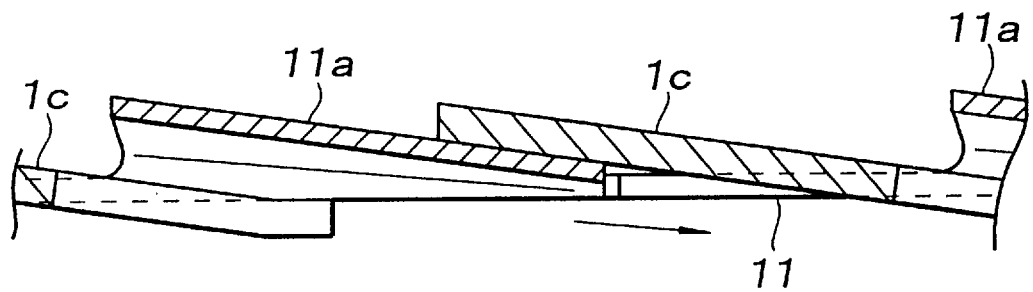
FIG. 5 is an enlarged view of an essential part of FIG. 2 for describing the working principle of wear compensation according to the present invention.

The pressure plate 5 is supported by the clutch cover 1 via cushion springs 10 consisting of sheet springs placed tangentially at three locations along the periphery of the pressure plate 5 (see FIG. 3) so as to be resiliently urged away from the clutch facing 4. When the clutch pedal is operated so as to axially actuate the release bearing 8 and pivot the diaphragm spring 6 as indicated by imaginary lines in FIG. 2, the pressure on the outer periphery of the pressure plate 5 is removed, and the clutch disk 3 is disengaged from the flywheel 2 to thereby disengage the clutch.

The end plate of the clutch cover 1 extending perpendicularly to the axial line of the clutch is formed with a plurality of resilient arcuate connecting pieces 1b cut from the material of the clutch cover 1 so as to extend circumferentially at a regular angular interval, and an annular disk 1c disposed radially inward of the connecting pieces 1b and resiliently supported by the connecting pieces 1b. The fulcrum support portions 1a are formed along the inner periphery of the annular disk 1c.

An annular slider ring 11 is coaxially placed over the front surface of the annular disk 1c. The slider ring 11 is shaped like a windmill and is provided with a plurality of radially outwardly projecting wedge vanes 11a along an outer periphery thereof at a regular angular interval. The slider ring 11 is attached to the clutch cover 1 so as to be coaxial and circumferentially slidable to each other with the wedge vanes 11a placed partly under the base ends of the connecting pieces 1b.

Figure 4:
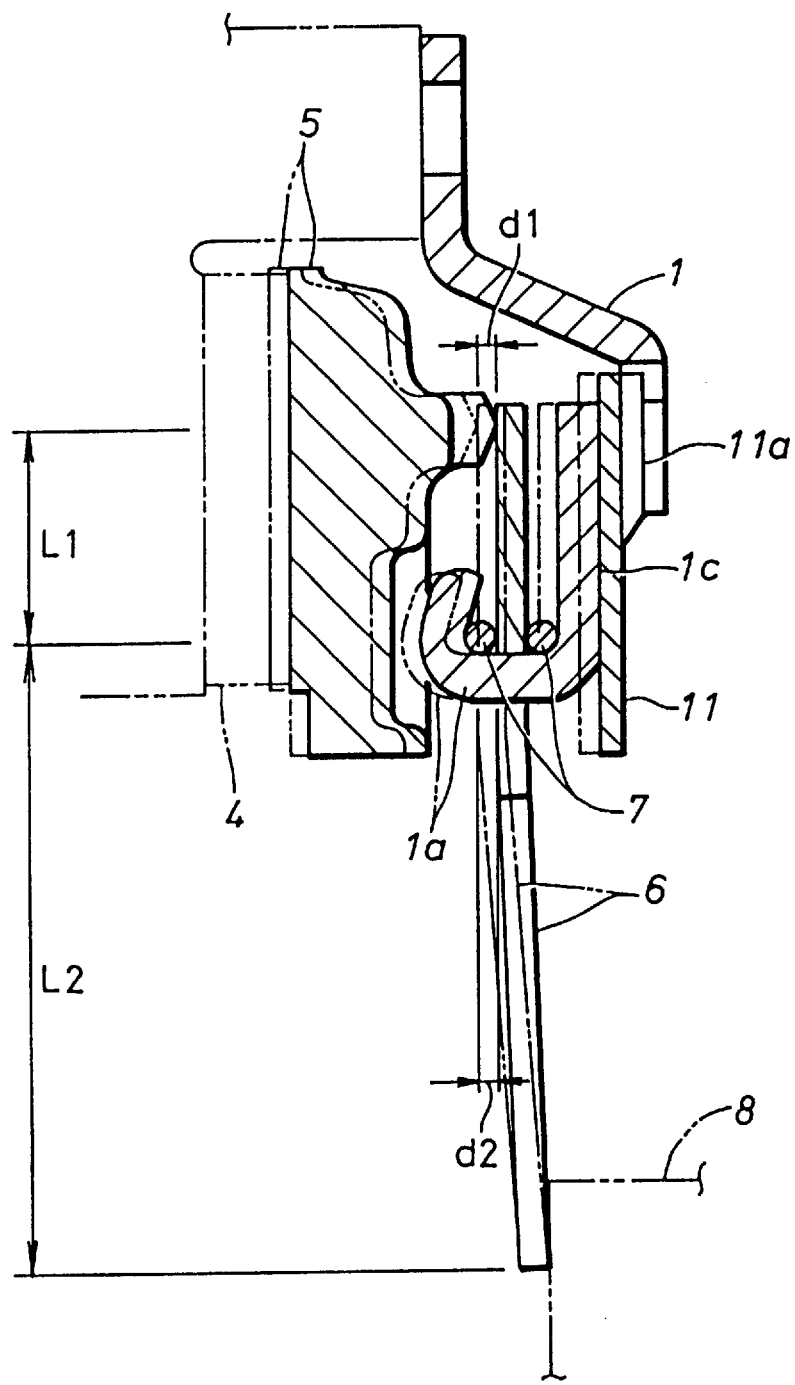
FIG. 4 is a sectional view of an essential part of the friction clutch taken along line IV—IV of FIG. 1.

Referring to FIG. 4, the surface of the wedge vanes 11a is disposed in an oblique orientation relative to the planar annular part of the slider ring 11. Therefore, as the slider ring 11 turns circumferentially as indicated by an arrow in FIG. 4, the wedge vanes 11a slide over the under surfaces of the relatively rigid base ends of the connecting pieces 1b so that the wedge vanes 11a axially force the annular portion 1c downward against the resilient force of the connecting pieces 1b.

A tension spring 12 extends between each of the connecting pieces 1b of the clutch cover 1 and the planar annular part of the slider ring 11. These tension springs 12 resiliently urge the slider ring 11 in the direction to force the wedge vanes 11a under the base ends of the connecting pieces 1b.

The clutch disk 3 is formed by interposing a steel disk with a pair of facing members 4 as mentioned earlier, and a wave spring 18 is interposed between the two facing members 4 so that the handling of the clutch at the time of partially engaging the clutch may be improved.

In this friction clutch which was described above, as the wear of the clutch facing members 4 progresses, the pressure plate 5 moves axially following the wear of the facing members 4 under the pressure from the diaphragm spring 6. The diaphragm spring 6 is provided with a spring property which minimizes the release load when the clutch is released, normally by stepping onto the clutch pedal, and the release load tends to increase as the displacement of the pressure plate 5 due the wear of the facing members 4 increases. Therefore, as the release load increases, and the fulcrum support portion 1b is pulled toward the clutch facing members 4, and the connecting pieces 1b are allowed to deflect so that the state indicated by the imaginary lines in FIG. 4 is produced.

The deflection of the connecting pieces 1b also causes a deflection of the annular disk 1c toward the facing members 4 with the result that the axial spacing between the free ends of the connecting pieces 1b (the parts connected to the annular disk 1c), and the base ends thereof increases. This in turn causes the slider ring 11 to slide circumferentially so as to fill the increased spacing with the wedge vanes 11a. Thus, the annular disk 1c is retained at the compensated position without any reversing movement, and so are the fulcrum support portions 1a. Therefore, the position of the fulcrum support portions 1a is automatically adjusted as the wear of the clutch facing members 4 progresses.

In this conjunction, the connecting pieces 1b are formed in such a manner that, even when the orientation of the diaphragm spring 6 changes as a result of the wear of the facing 4, the point of force application of the diaphragm spring 6 (the part which is engaged by the release bearing 8) remain substantially fixed.

For instance, if the radial distance between the point of the diaphragm spring 6 urging the pressure plate 5 and the fulcrum point defined by the fulcrum support portion 1a is L1, and the radial distance between the point of the diaphragm spring engaged by the release bearing 8 and the fulcrum point is L2, the deflection property of the connecting pieces 1b should be defined such that the displacement d2 of the fulcrum portion 1a (or the amount of wear compensation) for a given wear d1 should be d1·L2/(L1+L2).

Thus, according to the present invention, the point of force application for the diaphragm spring at the time of clutch release can be maintained at a substantially fixed position without regard to the progress of wear, simply by changing the configuration of the clutch cover. Therefore, there is no need to adjust the position of the release bearing in compensating for the wear of the clutch facing, and the overall structure of the clutch device can be simplified in structure and reduced in cost.

Although the present invention has been described in terms of preferred embodiments thereof, it is obvious to a person skilled in the art that various alterations and modifications are possible without departing from the scope of the present invention which is set forth in the appended claims.

What we claim is:

1. A friction clutch, comprising:
   a diaphragm spring consisting of an annular dish spring which resiliently urges a pressure plate into engagement with a clutch facing when the clutch is engaged, said pressure plate being connected to a clutch cover and resiliently urged away from said clutch facing;
   a fulcrum member which supports a fulcrum point of said diaphragm spring, said fulcrum member including a pair of annular wire members interposing said fulcrum point of said diaphragm spring;
   resilient support means for supporting said fulcrum member with respect to said clutch cover, said resilient support means including a resilient support member integrally extending from said clutch cover and having said annular wire members secured thereto, said resilient support member including an annular disk and connecting pieces connecting said annular disk to a remaining part of said clutch cover, both said annular disk and said connecting pieces being cut from material of said clutch cover, said resilient support means having a flexibility which withstands a normal release load but yields to a release load substantially greater than said normal release load, said yielding movement of said resilient support means producing a corresponding gap therein; and
   wedge means which is resiliently biased to fill said gap;
   wherein an increase in said release load resulting from wear in said clutch facing creates said gap, and said wedge means fills said gap so as to shift said diaphragm spring to a new position corresponding to progress in said wear without substantially changing an operating point of said diaphragm spring.

2. A friction clutch according to claim 1, wherein said resilient support member further comprises a J-shaped extension passed through a hole formed in the diaphragm spring and holding said annular wire members on a concave side thereof.

3. A friction clutch according to claim 1, wherein said wedge means comprises a slider member having a main body circumferentially slidably engaged to said annular disk, a wedge member extending radially from said annular slider main body and adapted to move into said gap, and a spring member circumferentially biasing said annular slider main body relative to said clutch cover so as to move said wedge member into said gap.

4. A friction clutch according to claim 1, wherein said resilient support member is provided with a flexibility which produces a displacement substantially equal to d1·L2/(L1+L2), where d1 is the amount of wear of said clutch facing, L1 is a radial distance between said fulcrum point of said diaphragm spring and a point of engagement between said pressure plate and said diaphragm spring, and L2 is a radial distance between said fulcrum point of said diaphragm spring and a point of said diaphragm spring engaging a release bearing.

5. A friction clutch, comprising:
   a diaphragm spring which resiliently urges a pressure plate into engagement with a clutch facing when the clutch is engaged, said pressure plate being connected to a clutch cover and resiliently urged away from said clutch facing;
   a fulcrum member which supports a fulcrum point of said diaphragm spring, said fulcrum member including a pair of annular wire members interposing said fulcrum point of said diaphragm spring;
   a resilient support member extending from said clutch cover which supports said fulcrum member with respect to said clutch cover and has said annular wire members secured thereto, said resilient support member including an annular disk and connecting pieces connecting said annular disk to a remaining part of said clutch cover the annular disk and the connecting pieces forming a monolithic unit, said resilient support member having a flexibility which withstands a normal release load but yields to a release load substantially greater than said normal release load, said yielding movement of said resilient support member producing a corresponding gap therein; and
   a wedge resiliently biased to fill said gap;
   wherein an increase in said release load resulting from wear in said clutch facing creates said gap, and said wedge fills said gap so as to shift said diaphragm spring to a new position corresponding to progress in said wear without substantially changing an operating point of said diaphragm spring.

* * * * *